April 30, 1963  G. W. McCARTY ETAL  3,087,519
PIVOTING SHOE FOR PORTABLE ELECTRIC JIG SAW
Filed Nov. 25, 1960  2 Sheets-Sheet 1
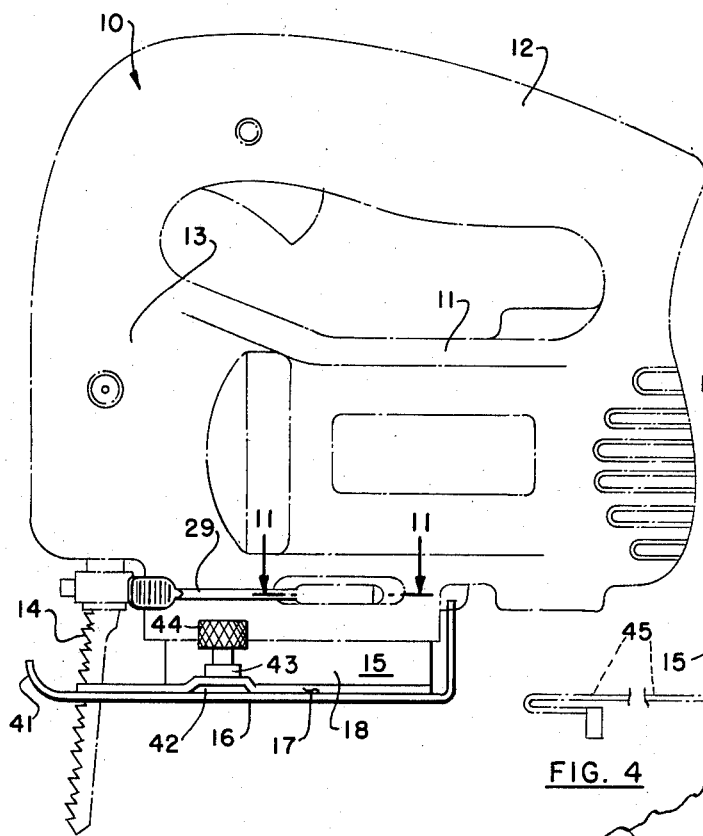
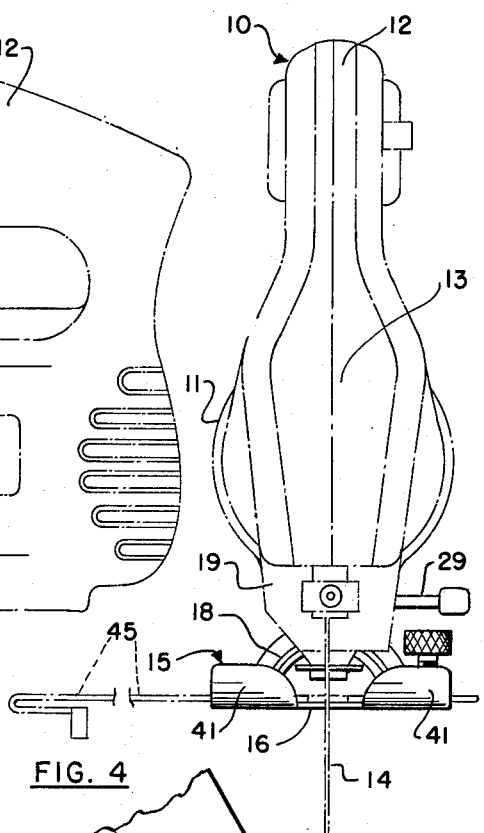
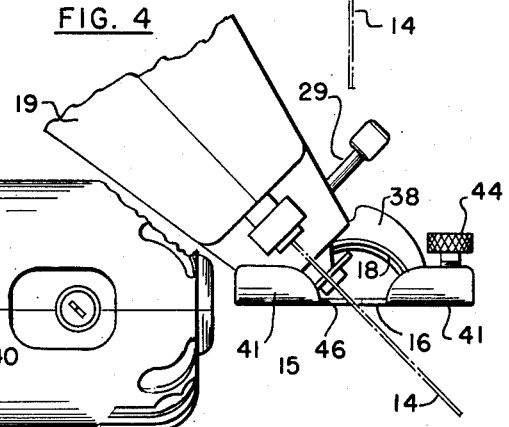
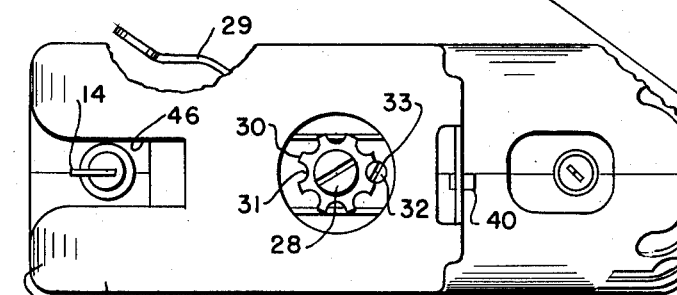
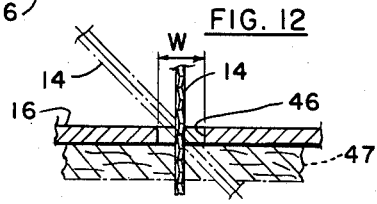
INVENTORS
GEORGE W. McCARTY
SAMUEL H. KOHLER
BY  *Leonard Bloom*
ATTORNEY

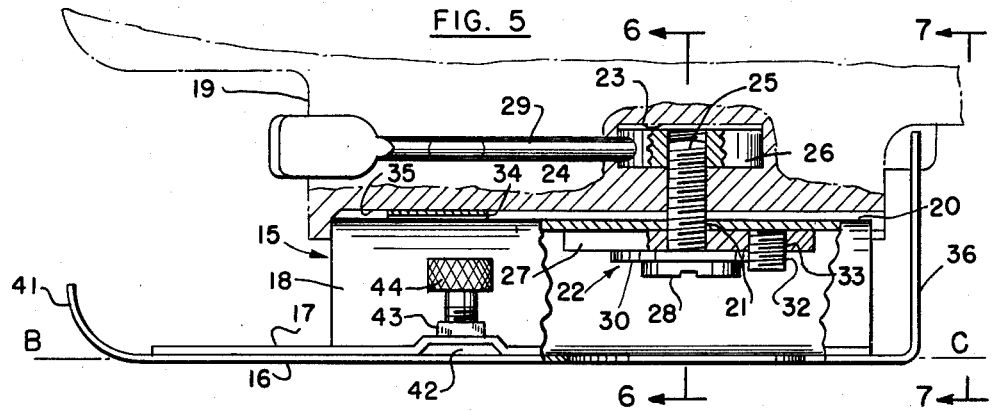
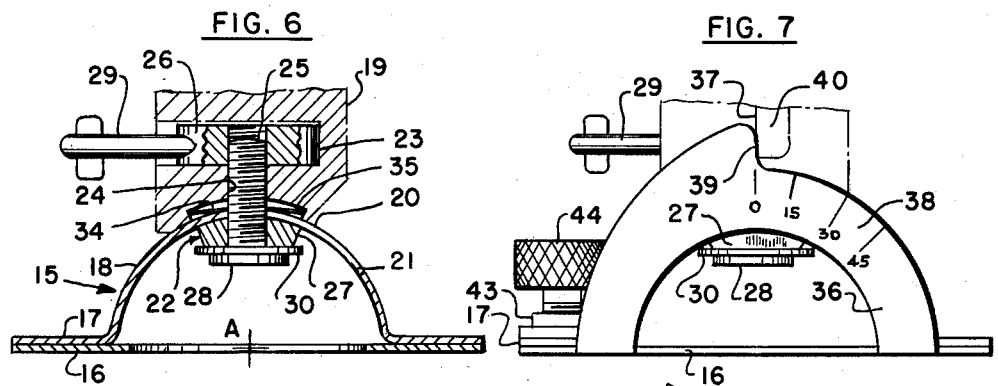
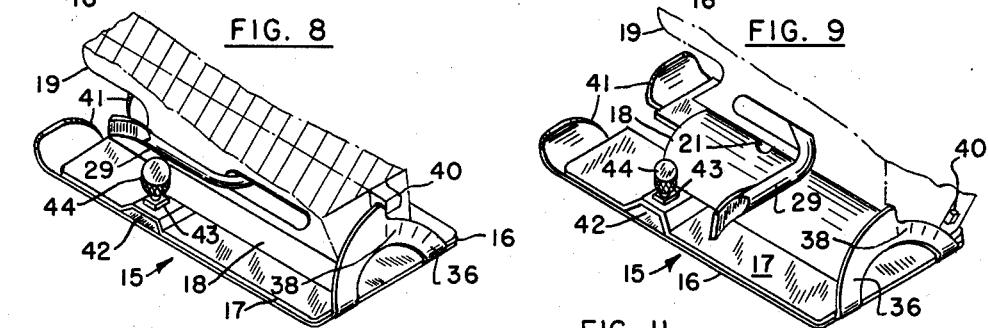
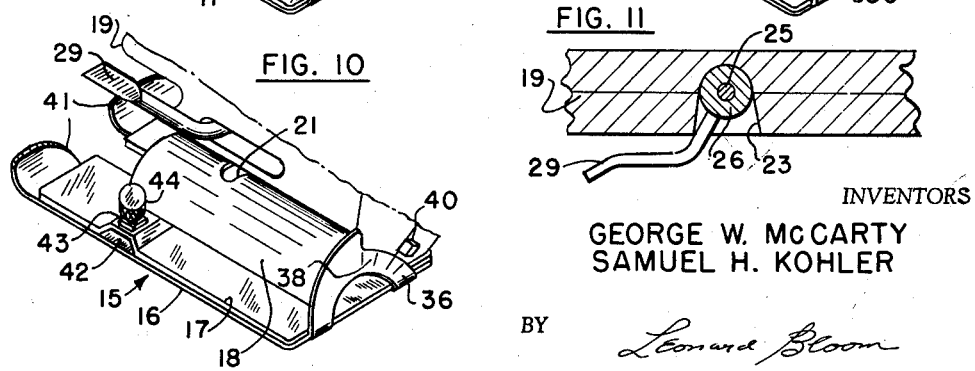
INVENTORS
GEORGE W. McCARTY
SAMUEL H. KOHLER
BY Leonard Bloom
ATTORNEY

United States Patent Office 3,087,519
Patented Apr. 30, 1963

3,087,519
PIVOTING SHOE FOR PORTABLE
ELECTRIC JIG SAW
George W. McCarty, Timonium, and Samuel H. Kohler, Baltimore, Md., assignors to The Black and Decker Manufacturing Company, Towson, Md., a corporation of Maryland
Filed Nov. 25, 1960, Ser. No. 71,674
3 Claims. (Cl. 143—68)

The present invention relates to a pivotable shoe for a portable electric jig saw or similar cutting tool, and more particularly, to such a shoe having a longitudinal phantom-pivot axis about which the tool may be pivotably adjusted for the making of beveled or similar cuts.

It is an object of the present invention to provide, for use with a portable electric jig saw or similar cutting tool, a pivotable shoe including a shoe plate having a conventional blade opening therein, together with means whereby the aforesaid longitudinal phantom-pivot axis lies substantially within the plane or planes of the shoe plate, thus minimizing the width of the blade opening.

It is another object of the present invention to provide a pivotable shoe for a portable electric jig saw or similar cutting tool, wherein the overall vertical height of the tool has been minimized.

It is yet another object of the present invention to provide, for use with a portable electric jig saw, a pivotable shoe that may be quickly and easily adjusted by the operator for facilitating the making of beveled cuts.

It is still another object of the present invention to provide fastening means between the shoe and the jig saw.

It is yet still another object of the present invention to provide a manually-manipulatable locking lever for the aforesaid fastening means, and to further provide tension adjustment means for the fastening means so as to avoid undesirable and costly manufacturing specifications and to compensate for variations occurring during the overall life of the tool.

It is a further object of the present invention to provide, for use with a portable electric jig saw, a simplified pivotable shoe structure that may be manufactured easily and economically.

In accordance with the teachings of the present invention, and for use with a portable power-operated cutting tool of the type having a reciprocating blade, there is provided the combination of a shoe which includes a lowermost work-engaging substantially-flat relatively-thin portion thereof having a blade opening therein, together with means to pivotably adjust the shoe with respect to the cutting tool about a longitudinal phantom-pivot axis lying substantially within the plane or planes of the work-engaging portion of the shoe, whereby the width of the blade opening in the shoe is minimized. More specifically, a shoe for a portable electric jig saw is provided, wherein the lowermost work-engaging portion comprises a substantially-flat relatively-thin shoe plate having a blade opening therein, and wherein a pivot plate is in turn secured to the shoe plate. The pivot plate includes at least a portion thereof formed concavely as a portion of a semi-cylindrical surface about the longitudinal phantom-pivot axis, the latter axis lying substantially within the plane or planes of the shoe plate. Moreover, the jig saw has a main housing which includes a lowermost portion thereof having an underside formed substantially complementary to a portion of the cylindrical shell portion of the pivot plate for the shoe, whereby the main housing of jig saw is adapted to rest upon the shoe. Manually-manipulatable fastening means are provided to adjustably secure the shoe and the main housing together, whereby the fastening means may be loosened to allow the main housing to be pivotably adjusted about the longitudinal phantom-pivot axis of the shoe, and whereby the fastening means may then be tightened to position the shoe and the main housing of the jig saw at a preselected pivotal relationship with respect to each other. The aforesaid fastening means includes a locking nut located within a cavity in the lowermost portion of the main housing of the jig saw; and a clamping screw passes through the pivot plate to engage the locking nut to secure the shoe to the jig saw, the clamping screw passing through a transverse slot formed in the semi-cylindrical shell portion of the pivot plate on a radius about the longitudinal phantom-pivot axis.

These and other objects of the present invention will become apparent from a reading of the following specification, taken in conjunction with the enclosed drawings, in which:

FIGURE 1 is a side elevation of the assembled shoe, showing its relationship or interconnection to the portable power-driven tool, which may be a portable electric jig saw shown in phantom view;

FIGURE 2 is a front elevation of the shoe and the jig saw as depicted in FIGURE 1;

FIGURE 3 is a bottom view thereof showing a portion of the fastening means and the tension adjustment means;

FIGURE 4 is a front elevation corresponding to that of FIGURE 2, but showing the jig saw adjusted at a preselected pivotal relationship with respect to the shoe, so as to facilitate the making of a beveled cut;

FIGURE 5 is an enlarged view of the shoe shown in FIGURE 1, with parts broken away and sectioned to illustrate the details of the fastening means;

FIGURE 6 is a view taken across the lines 6—6 of FIGURE 5, the adjustable securing means for the rip fence being deliberately omitted for clarity of understanding;

FIGURE 7 is a view taken across the lines 7—7 of FIGURE 5;

FIGURE 8 is a partial perspective view looking at the rear of the shoe and jig saw, as secured together in the normal upright position;

FIGURE 9 is a partial perspective view corresponding to that of FIGURE 8, but showing the shoe unclamped, and further showing the jig saw and the shoe pivotably adjusted with respect to each other at an angle corresponding to the angle of the desired bevel cut;

FIGURE 10 is a partial perspective view corresponding to that of FIGURE 9, but showing the shoe clamped or secured to the jig saw for the making of the desired beveled cut;

FIGURE 11 is a view taken along the lines 11—11 of FIGURE 1, showing the locking nut (and integral locking lever) as disposed within the cavity in the lowermost portion of the main housing of the jig saw; and FIGURE 12 is a partial schematic view illustrating how the longitudinal phantom-pivot axis is disposed within the plane or planes of the substantially-flat relatively-thin work-engaging shoe plate, thereby minimizing the width of the normal blade opening formed within the shoe plate.

With reference to FIGURES 1 and 2, there is illustrated a portable power-operated tool, such as a portable electric jig saw 10 (illustrated in phantom view for sake of convenience) having a main housing 11, an overhead switch handle 12, a gear case 13, a reciprocating blade 14, and a shoe, the latter being indicated generally as at 15.

With reference to FIGURES 1 and 2, and with further reference to FIGURES 5, 6, and 7, the shoe 15 includes a work-engaging substantially-flat relatively-thin shoe plate 16, together with a pivot plate 17 secured thereto, as by spot welding or other suitable means. The pivot plate 17 further includes a longitudinal centrally-disposed raised semi-cylindrical shell portion 18 thereof formed concavely about a longitudinal phantom-pivot axis, which axis is illustrated generally by means of the intersection A in FIGURE 6, and by the line B—C in FIGURE 5. Furthermore, as shown more particularly in FIGURES 5 and 6, the main housing 11 of the jig saw 10 includes a lowermost portion 19 having an underside 20 formed substantially complementary to the shell portion 18 of the shoe 15. In such a manner, the jig saw 10 is adapted to rest upon the shoe 15 and to be pivotably adjustable thereon for the purpose of making various bevel cuts, the adjustment being infinite between the "zero" position (that is, a normal or perpendicular cut) and 45 degrees. Moreover, as shown in FIGURE 6, the shell portion 18 includes a circumferential slot 21 formed transversely therein on a radius about the aforesaid longitudinal phantom-pivot axis, the purpose of slot 21 being hereinafter explained in detail.

With further reference to FIGURES 5 and 6, fastening means 22 are provided so as to adjustably secure the jig saw 10 to the shoe 15. More specifically, the lowermost portion 19 of the main housing 11 of the jig saw 10 includes a cavity 23, together with a communicating hole 24 running between the cavity 23 and the slot 21; and fastening means 22 includes a clamping screw 25 which passes through the transverse slot 21 and the communicating hole 24 so as to engage a locking nut 26 within the cavity 23. Moreover, fastening means 22 further includes a clamp plate 27 having an upper surface in the form of a portion of a cylinder so that the clamp plate 27 may lie flush against the underside of the shell portion 18 of the shoe 15; and as shown more clearly in FIGURE 6, clamp plate 27 lies between the shell 18 and the head 28 of the clamping screw 25.

In such a manner, it will be appreciated that if the clamping screw 25 is loosened the entire assembly of the main housing 11 of the jig saw 10, locking nut 26, clamping screw 25, and clamp plate 27, may then be pivotably adjusted with respect to the shoe 15 as defined by the limits of the slot 21. For ease of manufacture, slot 21 is chosen so as to limit the angular degree of pivotal adjustment between the shoe 15 and the jig saw 10 to the order of 45 degrees, within which the most popular beveled cuts are made; but naturally, it will be appreciated that the boundaries of the slot 21 may be made any desired circumferential length compatible with the semi-cylindrical shell 18, and that the scope of the present invention is not necessarily to be confined to the 45 degrees of pivotal or circumferential movement illustrated herein. Moreover, as shown in FIGURES 5 and 6, as well as in FIGURES 1, 2 and 11, the cavity 23 (preferably, but not necessarily) is accessible from the exterior of the jig saw 10; and a manually-manipulatable locking lever 29 is secured to the locking nut 26 and protrudes beyond the jig saw 10 for instantly actuating the fastening means 22, thus alternately loosening or securing the jaw saw 10 to the shoe 15, as desired.

As shown more particularly in FIGURES 3 and 5, tension adjustment means may be provided for the fastening means 22 (whenever the locking lever 29 is included) so as to avoid the usual necessity of having costly manufacturing specifications, as well as to compensate for any variations that may perhaps occur during the life of the tool. This tension adjustment means includes a locking flange 30, which is secured to the head 28 of the clamping screw 25, and which rests flush against the underside of the clamp plate 27. Locking flange 30 is provided with a circular periphery having a continuous series of circumferentially-spaced arcuate cut-outs, one of which is illustrated at 31 in the plan view thereof in FIGURE 3. The tension adjustment means further includes a set screw 32, which is confined within one such arcuate cut-out 31 in the locking flange 30, and which is received within a threaded recess 33 within the clamp plate 27. In such a manner, the set screw 32 may be removed, and the clamping screw 25 may then be turned slightly in one direction or another such that the inegral locking flange 30 is angularly adjusted by a few degrees, thus placing a different one of the arcuate cut-outs 31 adjacent to the recess 33. The set screw 32 may then be replaced within the recess 33 so as to be confined within a different one of the arcuate cut-outs 31, thus preventing relative movement between the clamping screw 25 and the clamp plate 27 whenever the locking nut is loosened to allow pivotal movement between the housing 19 and shoe 15; and in such a manner, it will be appreciated that the tension adjustment means for the fastening means 22 avoids any costly (and hence undesirable) manufacturing specifications, as well as any variations occurring during the life of the tool.

As further illustrated in FIGURES 5 and 6, pre-load resilient means are disposed between the jig saw 10 and the shoe 15, the object being to preclude an undesirably loose play or movement between the jig saw 10 and the shoe 15, whenever the locking lever 29 is manually adjusted so as to loosen the fastening means 22. The pre-load resilient means may take the convenient form of a flat spring 34, which is located in an axial portion of a relief 35 formed within the lowermost portion 19 of the main housing 11 and parallel to the upper surface of the shell portion 18 of the shoe 15.

Moreover, as illustrated more particularly in FIGURES 5 and 7, shoe plate 16 has a rearmost portion which includes an upturned graduation plate 36 which cooperates with an indicator 37 formed on the rearmost portion of the main housing 11 to illustrate the particular preselected pivotal (or angular) relationship of the jig saw 10 with respect to the shoe 15. Graduation plate 36 includes a quadrant 38 having suitable graduations thereon; and the graduation plate 36 also includes a radially-extending shoulder 39, which cooperates with a rearwardly-extending stop 40 (formed on the lowermost portion 19 of the main housing 11) so as to provide a "zero stop."

Also, as shown more particularly in FIGURES 1 and 2, the shoe plate 17 has a pair of upturned toes 41 which facilitates guiding the overall jig saw 10 along the work surface. Furthermore, the pivot plate 17 has a lanced guide slot 42, which in cooperation with a weld nut 43 and a screw 44, allows a rip fence 45 (illustrated in FIGURE 2 in partial phantom view for sake of convenience) to be inserted within the shoe 15.

With reference to FIGURES 8, 9, and 10, the inherent utility of the invention may be more readily appreciated. FIGURE 8 illustrates the jig saw 10 and the shoe 15 in its normal position, that is to say, with the locking lever 29 swung forwardly so as to secure the fastening means 22, thus maintaining the jig saw 10 and the shoe 15 in a rigidly-coupled position. Then, as illustrated in FIGURE 9, when it is desired to make a bevel cut necessitating a pivotal adjustment of the jig saw 10 with respect to the shoe 15, the locking lever 29 is moved rearwardly by the operator. This rearward movement of the locking lever 29, it will be appreciated, turns the locking nut 26 (by a few degrees) within the cavity 23, and thus sufficiently loosens the fastening means 22. Hence, the jig saw 10 may then be pivoted (or angularly adjusted) with respect to the shoe 15 within the limits defined by the slot 21; and it will be recalled that the pre-load resilient means (including the flat spring 34) prevents the jig saw 10 from being too loosely decoupled with respect to the shoe 15, but yet, not so tight as to preclude an easy pivoting action between the jig saw 10 and the shoe 15. Then, as more particularly illustrated in FIGURE 10, once the jig saw 10 has been pivotably adjusted with respect to the shoe 15 to the desired number of degrees (corresponding to the particular angle of the bevel cut to be made), the locking lever 29 may then be moved forwardly again so as to actuate the fastening means 22 and thus rigidly secure the jig saw 10 to the shoe 15 in its preselected pivotably-adjusted position.

With respect to FIGURE 4, there is illustrated a partial front elevational view of the jig saw 10 pivotably-adjusted with respect to the shoe 15, in the manner as previously recited.

With respect to FIGURE 12, an important aspect of the present invention may be more readily appreciated. The shoe plate 16, which rests upon the work 27, has a blade opening 46 therein, and the aforesaid longitudinal phantom-pivot axis (line B—C in FIGURE 5) is transverse (in FIGURE 12) to the plane of the paper at the intersection of the blade 14 and the shoe plate 16. By providing for the longitudinal phantom-pivot axis to fall within the plane or planes of the relatively-thin substantially-flat work-engaging shoe plate 16—ideally, the longitudinal phantom-pivot axis should be within the precise center of the thickness of the shoe plate 16—it will be appreciated, then, that the width W which is normally required for the blade opening 46 in the plate 16 will be held to an absolute minimum value. Minimizing the width W of the blade opening 46 is important insofar as it determines, to a large extent, the degree of lateral splintering that normally occurs on the top surface of the usual workpiece 47, especially if the jig saw 10 is cutting through plywood or similarly-laminated material. Naturally, the smaller that the blade opening 46 may be made, the more support will be provided by the shoe plate 16 as it rests against the top fibers of the workpiece 47, it being noted that the normal cutting action of the blade occurs in the upward stroke. Moreover, by providing for the longitudinal phantom-pivot axis to fall within the confines of the shoe plate 16, that is to say, approximately within the top surface of the workpiece 47 itself, an overall jig saw design is facilitated in which a pivotable shoe 15 may be featured consonant with minizing the overall vertical height of the tool. Minimizing the overall height of the tool is important insofar as it determines the degree of operator control, and hence, the accuracy of the cut.

Obviously, many modifications may be made without departing from the basic spirit of the present invention; and therefore, within the scope of the appended claims, the invention may be practiced other than has been specifically described.

We claim:
1. In a pivoting shoe for a portable electric jig saw, that improvement which comprises, in combination:
(a) a substantially-flat work-engaging portion;
(b) a raised semi-cylindrical shell portion secured on top of said work-engaging portion, concave with respect to said work-engaging portion, and externally accessible through said work-engaging portion;
(c) a housing having a lowermost portion, complementarily formed with said raised shell portion, and resting upon said shell portion;
(d) a cavity formed within said lowermost portion of said housing;
(e) a locking nut received within said cavity;
(f) a circumferential slot formed transversely within said shell portion;
(g) a fastening screw passing up through said slot to engage said nut;
(h) a locking flange integrally carried by said fastening screw;
(i) a clamping member between said locking flange and said raised shell portion, cooperating with the inside of said shell portion, and extending longitudinally beyond said locking flange of said fastening screw;
(j) said locking flange having a plurality of peripheral openings, circumferentially-spaced one from another;
(k) a set screw passing up through one of said openings in said locking flange; and
(l) a tapped hole formed in said clamping member to receive said set screw.

2. In a pivoting shoe for a portable electric jig saw, that improvement which comprises, in combination:
(a) a substantially-flat work-engaging portion;
(b) a raised semi-cylindrical shell portion secured on top of said work-engaging portion, concave with respect to said work-engaging portion, and accessible through said work-engaging portion;
(c) a housing having a lowermost portion, complementarily formed with said raised shell portion, and resting upon said shell portion;
(d) a cavity formed laterally within said lowermost portion of said housing and having a mouth portion which opens to one side of said housing;
(e) a locking nut received within said cavity;
(f) a locking lever integrally formed with said locking nut and protruding through said mouth portion of said cavity;
(g) a circumferential slot formed transversely within said shell portion; and
(h) fastening means between said raised shell portion and said housing and including a screw passing up through said slot to engage said locking nut;
(i) said screw being at one end of said slot in the normal position of the shoe.

3. In a pivoting shoe for a portable electric jig saw, that improvement which comprises, in combination:
(a) a substantially-flat work-engaging portion;
(b) a raised semi-cylindrical portion secured on top of said work-engaging portion, concave with respect to said work-engaging portion, and externally accessible through said work-engaging portion;
(c) a housing having a lowermost portion, complementarily formed with said raised shell portion, and resting upon said shell portion;
(d) a cavity formed laterally in said housing;
(e) a locking nut received within said cavity;
(f) a circumferential slot formed transversely in said raised shell portion;
(g) fastening means between said raised shell portion and said housing and including a headed screw passing up through said slot to engage said locking nut;
(h) said screw being at one end of said slot in the normal position of the shoe;
(i) said work-engaging portion of the shoe including an upturned rearward flange having a radially-extending shoulder and further having graduations placed thereon to one side of said shoulder; and
(j) said housing having a rearwardly-extending stop having a surface which cooperates with said shoulder on said rearward flange to provide a "zero stop" for the normal position of the shoe.

References Cited in the file of this patent
UNITED STATES PATENTS

| | | |
|---|---|---|
| 1,102,792 | Patton | July 7, 1914 |
| 2,500,784 | Anderson | Mar. 14, 1950 |
| 2,544,461 | Leitzel | Mar. 6, 1951 |
| 2,695,522 | Papworth | Nov. 30, 1954 |
| 2,902,067 | Oakley | Sept. 1, 1959 |
| 2,949,944 | Blachly | Aug. 23, 1960 |
| 2,966,178 | Katzfey | Dec. 27, 1960 |

FOREIGN PATENTS

| | | |
|---|---|---|
| 494,488 | Great Britain | Oct. 26, 1938 |